(12) United States Patent
Cashman et al.

(10) Patent No.: US 10,044,796 B2
(45) Date of Patent: *Aug. 7, 2018

(54) METHOD AND SYSTEM FOR TRANSMITTING AN APPLICATION MESSAGE BETWEEN NODES OF A CLUSTERED DATA PROCESSING SYSTEM

(71) Applicant: INTERNATIONAL BUSINESS MACHINES CORPORATION, Armonk, NY (US)

(72) Inventors: Paul N. Cashman, Alton (GB); Carlos Fuente, Portsmouth (GB); William J. Scales, Portchester (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 152 days.

This patent is subject to a terminal disclaimer.

(21) Appl. No.: 15/062,320

(22) Filed: Mar. 7, 2016

(65) Prior Publication Data

US 2016/0191615 A1 Jun. 30, 2016

Related U.S. Application Data

(63) Continuation of application No. 14/458,707, filed on Aug. 13, 2014, now Pat. No. 9,300,730, which is a (Continued)

(30) Foreign Application Priority Data

Nov. 29, 2002 (GB) .................................. 0227871.1

(51) Int. Cl.
*G06F 15/16* (2006.01)
*H04L 29/08* (2006.01)
(Continued)

(52) U.S. Cl.
CPC .............. *H04L 67/10* (2013.01); *H04L 45/46* (2013.01); *H04L 47/722* (2013.01); *H04L 49/90* (2013.01);
(Continued)

(58) Field of Classification Search
CPC ....... H04L 45/46; H04L 47/722; H04L 49/90; H04L 61/6045; H04L 67/10;
(Continued)

(56) References Cited

U.S. PATENT DOCUMENTS 4,995,056 A 2/1991 Fogg et al.
5,619,544 A 4/1997 Lewis et al.
(Continued)

FOREIGN PATENT DOCUMENTS

| JP | H02142275 A | 5/1990 |
| JP | H09186741 A | 7/1997 |
| JP | 2006508599 A | 3/2006 |

OTHER PUBLICATIONS

"Information Technology—Fibre Channel Protocol for SCSI, Second Version (FCP-2)," American National Standard for Information Systems, Sep. 23, 2002 (147 pages).
(Continued)

*Primary Examiner* — June Sison
(74) *Attorney, Agent, or Firm* — Griffiths & Seaton PLLC (57) ABSTRACT

Systems for transmitting an application message between nodes of a clustered data processing system are disclosed. One system includes a determination of whether one or more application messages may currently be transmitted to a first node of a plurality of nodes from a second node of the plurality of nodes. The system further includes processing the one or more application messages in response to a determination that the one or more application messages may be currently transmitted.

17 Claims, 4 Drawing Sheets

Related U.S. Application Data continuation of application No. 11/137,167, filed on May 25, 2005, now Pat. No. 8,812,606, which is a continuation of application No. PCT/GB03/03535, filed on Aug. 13, 2003.

(51) Int. Cl.

| | | |
|---|---|---|
| *H04L 12/925* | (2013.01) | |
| *H04L 29/12* | (2006.01) | |
| *H04L 12/715* | (2013.01) | |
| *H04L 12/861* | (2013.01) | |

(52) U.S. Cl.
CPC ...... *H04L 61/6045* (2013.01); *H04L 67/1002* (2013.01); *H04L 67/1008* (2013.01); *H04L 67/14* (2013.01); *H04L 67/32* (2013.01); *H04L 69/329* (2013.01)

(58) Field of Classification Search
CPC . H04L 67/1002; H04L 67/1008; H04L 67/14; H04L 67/32; H04L 67/329
See application file for complete search history.

(56) References Cited

U.S. PATENT DOCUMENTS

| | | |
|---|---|---|
| 6,144,668 A | 11/2000 | Bass et al. |
| 6,345,296 B1 | 2/2002 | McCrory et al. |
| 6,463,498 B1 | 10/2002 | Wakeley et al. |
| 6,694,400 B1 | 2/2004 | Lai et al. |
| 2003/0202474 A1 | 10/2003 | Kreuzenstein et al. |
| 2010/0202294 A1 | 8/2010 | Mullendore et al. |
| 2011/0167218 A1 | 7/2011 | Matsunami et al. |
| 2011/0173388 A1 | 7/2011 | Sanada et al. |

OTHER PUBLICATIONS

"Fibre Channel 2nd Generation Physical Interface," American National Standard for Information Systems, Sep. 10, 1996 (7 pages).

Snively, "Implementing a Fibre Channel SCSI Transport," IEEE, Sun Microsystems Computer Corporation, Mountain View, CA, 1994 (5 pages).

Benner, "Fibre Channel-gigabit Communications and I/O for Computer Networks," McGraw Hill, United States, pp. 265-271, Nov. 1995 (8 pages).

Translation of Art cited in counterpart Japanese Application No. 2004-556458 Office Action dated Jan. 13, 2009 (1 page).

METHOD AND SYSTEM FOR TRANSMITTING AN APPLICATION MESSAGE BETWEEN NODES OF A CLUSTERED DATA PROCESSING SYSTEM

CROSS-REFERENCE TO RELATED APPLICATIONS

The present application is a Continuation of U.S. patent application Ser. No. 14/458,707, filed Aug. 13, 2014, which is a Continuation of U.S. Pat. No. 8,812,606, filed on May 25, 2005, which is a continuation under 35 U.S.C. § 120 of International Patent Application No. PCT/GB2003/003535 filed on Aug. 13, 2003 designating the United States and claiming priority to United Kingdom Patent Application No. 0227871.1 filed on Nov. 29, 2002, and entitled "Data Processing Systems" under 35 U.S.C. § 365, each of which are incorporated herein by reference in their entireties and for all purposes.

BACKGROUND

Technical Field

Embodiments of the present invention relate generally to data processing system communications and more particularly to a method and system for transmitting an application message between nodes of a clustered data processing system.

Description of the Related Art

It is becoming increasingly common in data processing and computer systems to move from large, monolithic systems towards more modular distributed or clustered systems. This is because distributed systems can, for example, provide advantages in terms of management efficiency and greater performance. They can also give lower entry cost, higher scalability and allow the use of commodity PC (Personal Computer) servers.

Such distributed systems are typically arranged as a data communications network comprising a number of different processing devices (e.g., computers) and peripheral devices such as storage devices which form "nodes" of the network and are interconnected by appropriate communications channels over which they can communicate with each other and exchange messages. In such arrangements, each "node" of the system will also typically include a so-called port or interface adapter that will exchange data, etc., with the system devices making up the node via a local data bus and also control and carry out communication exchanges with other nodes and devices of the system via the communications network. An example of such a data processing system is a communications network-based distributed mass storage system.

In this type of arrangement, communication between nodes over the communications network normally takes place using a known and standardized communications protocol. One commonly used architecture and protocol for such data communications networks is the so-called "Fibre Channel" protocol (see, for example, ANSI X3.303: 1998 which defines the Fibre Channel physical interface).

In a Fibre Channel system, each node of the communications network (e.g., processing or peripheral device) is linked to the network by a Fibre Channel Port which, inter alia, exchanges data with the processing or peripheral device or devices (often referred to as a "host") of the node via a local data bus. The Fibre Channel Port also includes an interface controller that conducts lower level protocol exchanges between the Fibre Channel communications network and the host processing or peripheral device or devices with which the Fibre Channel port is associated.

Fibre Channel systems also support, and are able to transfer data according to, higher level communications protocols, such as IP (Internet protocol), and the SCSI (Small Computer Systems Interface) protocol (see, for example, ANSI X3.270: 1996 which is an architecture document and SPC2 NCITS.351:2001 which describes SCSI primary commands). The SCSI protocol is, as is known in the art, commonly used for communications such as read and write commands from a host processing device (e.g., computer) to a peripheral storage device. Indeed, the presently predominant communications protocol and network architecture for distributed storage systems is SCSI over Fibre Channel (referred to as "FCP" (and defined in, inter alia, ANSI X3.269:1996)). In such arrangements, the higher level communications protocol such as the SCSI protocol is implemented on top of the Fibre Channel protocol.

When using distributed systems involving communications networks, it is important to have an efficient communication mechanism for exchanging the messages that applications of the system might need to send between nodes and devices of the system to carry out the useful functions of the system, such as the information that must be exchanged to achieve those useful functions. Examples of such application messages would include messages such as request, grant, lock, invalidate, etc., messages that might be exchanged in a distributed system to access and manipulate metadata relating to a set of data (or the data itself), for example, for flash copy functions, such as to determine whether a set of data has been flash copied or locked, and/or more generally the messages that the system's control algorithms will use to control and carry out the useful functions of the system. It will be appreciated by those skilled in the art that such application messages should be distinguished from the lower level commands and protocol messages, such as an indication to the receiver to expect an application message, that may also be exchanged between nodes of the network to control the sending of the application message itself.

The issue of efficient application message exchange is exacerbated in distributed storage systems, because the messaging overhead budget is often measured in tens of microseconds.

One way to enhance the efficiency of such application message exchange in a distributed system would be to use an upper level communications protocol which is designed more for messaging, such as the Virtual Interface (VI) protocol for such application messages. However, not all existing communications protocol ports and adapters, such as Fibre Channel adapters, will support such additional communications protocols. It would also be possible to use a separate network within the distributed system which is more optimized for messaging, such as an InfiniBand network, but while that may give better performance, it would carry the increased cost of an additional communications network needing to be added to the system.

It is also known to use the existing communications network and protocol of the distributed system to exchange application messages between nodes (and hence devices) linked by the communications network. For example, existing communications protocols such as Fibre Channel and SCSI over Fibre Channel support the "writing" of data from one network node to another. It is possible therefore to use this "write" process to "write" an application message to the intended receiver over the communications network.

In such an arrangement, the message originator would issue a write (or similar) command protocol message (i.e. a command that it wishes to transfer "data" to the intended receiver) to the intended receiver of the application message, with the system then operating subsequently as for any other write operation. Thus, for example, in a Fibre Channel based system operating in this manner, upon receipt of the write command, the receiver would be interrupted, inspect the write command, allocate memory space to receive the intended application message and then return a "transfer ready" protocol message to the application message originator. The application message originator would then transfer the application message, with the receiver again being interrupted to inform it of the successful application message transmission. The receiver would then complete the write command, and notify the application message originator of the application message completion, at which point the application message initiator can release the resources associated with the application message.

An example of such an arrangement is the use of a SCSI SEND command to send an application message between two SCSI ports that include processing devices. In such an arrangement, the lower levels of the SCSI implementation of the SEND command (for both software and hardware) are the same as for a SCSI WRITE command.

Such arrangements take advantage of the existing communications protocols and hardware used in the network and can work satisfactorily, since, for example, in the case of a SCSI system, much of the protocol message processing can be performed in custom hardware in the SCSI adapter, thereby freeing the main host system processor to do higher level tasks. Furthermore, in most readily available SCSI attachment adapters, the application message issuer will only process the initial write (send) request and the final completion protocol message (although the receiver has a little more to do, including handling the initial receipt of the write command, the setup for the application message transfer (such as preparing a memory location for the application message), the notification that the message transfer is complete and the transmission of the final completion protocol message (and any associated "tidying up")).

However, the Applicants have recognized that a drawback with this type of arrangement is that the application message transmission time is delayed by the initial "handshaking" that is required. The biggest delay will typically be in the processor handling at the receiver end to set the receiver up for the receipt of the application message, although there may also be some significant round trip delay in the network fabric itself. For many IO (Input/Output) operations, such as those associated with write caching, such processing delay or latency is a key determining factor in the performance perceived by a large class of applications (and as such is undesirable).

Thus the Applicants believe that there remains a need for an application message transmission and receipt process in distributed data processing systems that can reduce latency and/or the total overhead in application message handling.

SUMMARY

A system is provided for transmitting an application message between nodes of a clustered data processing system. According to one embodiment of the present invention, the system comprises: a processor executing instructions stored in memory to provide a plurality of nodes, coupled to and in communication with each other, each node comprising: a respective first buffer, and a respective second buffer, wherein each node is configured for: preparing its respective first buffer for receiving application messages, transmitting a read request to every other node, wherein: each read request is transmitted in response to each respective first buffer being prepared for receiving messages, and each read request comprises a reference to its respective first buffer, commanding every node to transmit one or more application messages to its respective first buffer, receiving each read request, determining, at a first time, whether its second buffer comprises the one or more application messages for transmittal to each node in response to a receipt of each read request, and immediately processing each read request if the second buffer comprises the one or more application messages at the first time, wherein processing each read request comprises: transmitting an application message of the one or more application messages from each node to every other node in response to a determination that the second buffer comprises the one or more application messages, the application message specifying that each respective first buffer is a destination of the application message, and recording data indicating that each read request from every other node has been received in response to a determination that the second buffer does not comprise the one or more application messages.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways including implementation in hardware, i.e. ASICs and special purpose electronic circuits, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous features and advantages made apparent to those skilled in the art by referencing the accompanying drawings in which.

The use of the same reference symbols in different drawings indicates similar or identical items.

DETAILED DESCRIPTION OF AN ILLUSTRATIVE EMBODIMENT

The following sets forth a detailed description of at least the best contemplated mode for carrying out the one or more systems, devices and/or processes described herein. The description is intended to be illustrative and should not be taken to be limiting.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some.

According to one embodiment of the present invention, there is provided a method of transmitting a message in a data processing system comprising a network of two or more nodes in communication with each other, the method comprising: a first node of the network transmitting to another node of the network a request to receive data from that node; the other node of the network receiving the request to receive data and, when it has a message for the first network node, completing processing of the request to receive data to transfer the message to the first network node.

According to another embodiment of the present invention, there is provided a data processing system comprising a network of two or more nodes in communication with each other, wherein: a first node of the network comprises means for transmitting to another node of the network a request to receive data from that node of the network; and a second node of the network comprises means for receiving the request to receive data, and, when it has a message for the first network node, completing processing of the request to receive data to transfer the message to the first network node.

Embodiments of the present invention also extend to an apparatus for allowing a node of a communications network forming a distributed data processing system to operate in accordance with the method of the present invention. Thus, according to another embodiment of the present invention, there is provided an apparatus for use in a node of a data communications network, comprising: means for transmitting to another node of the network a request to receive data from that network node; means for receiving a request to receive data from another node of the network; and means for identifying when the node of the network has a message for the other node of the network, and for, when the node of the network has a message for the other node of the network, completing processing of the received request to receive data to transfer the message to the other node of the network.

In embodiments of the present invention, messages are transferred between nodes of the network by the ultimate message recipient transmitting a request to receive data to another node of the network, in response to which the other network node returns a message when it has a message for the requesting network node. In effect, the communication is run backwards, by using a data request to "pull" the message to the receiver, rather than a data sending or write command to "push it" to the receiver. This has the advantage that the latency between the message being ready for transmission and being received at the receiver is reduced, since the message once ready for transmission does not have to wait for the receiver to carry out all its set up processing before the message can be sent, and there is no round-trip delay in notifying the receiver to expect a message. There is also less overall system utilization, since a request to receive data generally requires less processing than a request to send data such as a write command. For example, with a request to receive data, at the receiver there may typically be one setup process and two interrupts, whereas with a request to send data there may typically be two setup processes that have to be carried out, and three interrupts.

The request to receive data that the first network node transmits can take any suitable form. It will be appreciated that such a request should be identifiable as a request for data at a higher level, such as at an application message level, and not simply a (very) low level request such as protocol messages relating to the availability of buffer space that may be necessary to actually carry out the application message transfer process. Thus the request to receive data will typically be one that can have a well-identified single response. It will also be appreciated that since at the time the request to receive data is sent, the request sending node will not know what message or messages, if any, the node the request is sent to has to send to the requesting node, nor what form of reply it might receive, then the request to receive data should also be of a general form that does not require or anticipate any particular response and indeed can be responded to basically by returning any form of message (so long as it can be identified as a response to the request to receive data).

The request to receive data is preferably in the form of a standard such request for the communications protocol being used over the network of the distributed system. The request to receive data preferably comprises a request to read data from the other node of the network, and most preferably is in the form of a "read" command that is sent to the other node of the network.

In yet another embodiment, before a node of the network sends a request to receive data (e.g., read command) to another node in accordance with the present invention, it first establishes that it has memory resources (storage space) available to receive the anticipated message or messages that will be sent in response to the request to receive data.

According to the described embodiment, the network node also then actually makes such storage resources available for receipt of the application message before sending the request to receive data, e.g., by preparing a storage location, such as a buffer, into which to receive messages in response to the request. This storage location is then used as the receiving storage location for the message (data) returned in response to the request to receive data sent to the other node of the network. According to another embodiment of the present invention, the network node cannot issue a request to receive data until it has prepared a storage location in this manner.

Alternatively, the actual physical definition of the storage location (e.g., buffer) could be delayed until the application message is received, with the storage location being defined at that time by, for example, some memory management hardware. These arrangements help to ensure that the receiver has space to receive the transmitted message before the message is sent and therefore provide a means of flow control.

The storage location, e.g., buffer, for the received messages can be of any suitable size, but should be sufficient to be able to accept an expected message. In one embodiment, it is of a size able to store (and thus receive) plural messages simultaneously. Moreover, in another embodiment, the message sending node (i.e. the receiver of the request to receive data) is aware of the message storage capacity provided at the requesting node, as it can then ensure that any messages it sends do not exceed that capacity. This information could be provided to the message sending node by determining (and fixing) in advance what the storage capacity will be (and informing the nodes accordingly (e.g., by some prior protocol message exchange)). Alternatively or additionally the requesting node could determine its storage capacity dynamically in use and indicate its current storage capacity to the message sending node in use, for example by including that information with the request to receive data.

According to yet another embodiment of the present invention, there is provided an apparatus for use in a node of a data processing communications network, comprising: means for establishing whether a storage location for receiving a message is available at the node; and means for, if it is established that a storage location is available, transmitting a request to receive data to another node of the network.

In another embodiment of the present invention, there is provided a method of operating a node of a data communications network, comprising: the node establishing whether a storage location for receiving a message from another node of the network is available at the node, and, if a storage location is available, transmitting a request to receive data to another node of the network.

As discussed above, embodiments of the invention may further include means for or steps of preparing a storage location at the node for receiving the message and only once the storage location is prepared, then sending the request to receive data. The network node that receives the data transfer request (e.g., read command) should transmit a message in response to the data request when it has a message for the network node that send the data request.

If upon receipt of the request to receive data, the receiving node of the network does not have a message to send to the sender of the request to receive data, it suspends processing of the request to receive data until it has a message to send to the sender of the request to receive data. However, where the recipient of the request to receive data already has a message for the request issuing node, it immediately commences the transmission process for that message upon receipt of the request to receive data.

Thus, according to another embodiment of the present invention, there is provided an apparatus for use in a node of a data communications network, comprising: means for receiving a request to receive data from another node of the network; means for determining whether the node of the network has a pending message to be sent to the requesting network node; means for, when it is determined that the network node does not have a pending message to be sent to the requesting network node, suspending processing of the received request to receive data; and means for, when the network node has a pending message for the requesting network node, completing processing of the request to receive data to transfer the message to the requesting network node.

According to another embodiment of the present invention, there is provided a method of operating a node of a data communications network, comprising: the node: receiving a request to receive data from another node of the network; determining whether the network node has a pending message to be sent to the requesting network node; when it is determined that the network node does not have a pending message to be sent to the requesting network node, suspending processing of the received request to receive data; and when the network node has a pending message for the requesting network node, completing processing of the request to receive data to transfer the message to the requesting network node.

In another embodiment, when a network node has a message to send to another network node, it preferably does not send that message (which it could do using, e.g., a "write" command process as discussed above) until it has received a request to receive data from the network node for which the message is intended. In the described embodiment, the network nodes queue messages to be sent to other nodes of the network before they receive an appropriate request to receive data from the relevant node, and, upon receipt of a request to receive data from the appropriate node, then, as discussed above, transmit (immediately) the queue of waiting messages for that network node. Once a message or messages have been sent in response to a request to receive data, the message sender will then start to queue messages again until a new request to receive data is received from the relevant network node. This arrangement naturally causes message batching to occur, thereby, e.g., leading to more efficient messaging when the system is more heavily loaded (in which situation any latency due to message batching will be less of an issue).

According to another embodiment of the present invention, there is provided an apparatus for use in a node of a data communications network, comprising: means for identifying messages to be transmitted to another node of the network; means for determining whether the network node has received a pending request to receive data from the other node of the network; and means for, where the network node does not have a pending request to receive data from the network node for which the message is intended, storing the message without transmitting it until a request to receive data from the network node for which the message is intended is received.

According to another embodiment of the present invention, there is provided a method of operating a node of a data communications network, comprising: the node: identifying messages to be transmitted to another node of the network; determining whether the network node has received a pending request to receive data from the other node of the network; and where the network node does not have a pending request to receive data from the network node for which the message is intended, storing the message without transmitting it until a request to receive data from the network node for which the message is intended is received.

The transmission of a message or messages in response to the request to receive data can be carried out in any suitable manner and will, for example, depend on how such requests (e.g., read commands) are processed for the communication protocol being used. The process should, where appropriate, transfer the message or messages to the storage location that the requesting network node has prepared for receipt of the message or messages. Thus, for example, in a Fibre Channel and/or SCSI type system, the message sender preferably prepares a storage location, e.g., a buffer, containing the message or messages, and responds to the request to receive data referencing the storage location containing the message or messages.

When the request to receive data issuer is notified that its request has been responded to, it would then, for example, inspect the storage location it prepared for the receipt of the message or messages to process the message or messages it has received. Any known techniques for enhancing or improving the request to receive data (e.g., read command)

process of the communications protocol in question can be used when the request to receive data is completed. Thus, for example, the known optimization in SCSI-type adapter implementations that allows for a message (data) transfer and completion (status) message associated with a read command to be transferred by the hardware with just one request from the software and one completion interrupt from the hardware can be used in SCSI-type implementations of the present invention.

Once a node of the network has had its request to receive data (e.g., read command) completed, it issues a further request to receive data, e.g., substantially immediately, to the network node that completed its request, so that it is ready to receive further messages from that node. It would also be possible for a node to send multiple simultaneous requests to receive data to, and/or maintain multiple simultaneous requests to receive data with, another (the same) node of the network. This may be appropriate where, for example, the message transmission rate necessary to meet the throughput of messages offered cannot be met by simply sending a single new request to receive data each time an existing pending request is met.

It will be appreciated by those skilled in the art that before a communications network can operate in accordance with the present invention it may be necessary for the network nodes (i.e., the intended message sender and receiver) to have first identified each other and carried out some form of "handshaking" in anticipation of the need to send and receive messages. However, in practice, there is already likely to have been a (sufficient) degree of handshaking in any communications network in which the present invention can be applied, particularly where the network can use write commands. For example, in a Fibre Channel system, network devices must exchange particular "logins" (FC2 and FC4 logins) before they can exchange IO (Input/Output) requests.

In its most basic arrangement the present invention can be used where one network node acts as a message sender and the other network node acts as a message receiver. However, in alternative embodiments, each of the pair of nodes can both send and receive messages, so that a send and reply capability is established. This can be achieved by each node of the pair sending a request to receive data to the other node of the pair. Furthermore, where, as could typically be the case, the network comprises more than two nodes, one or more given, e.g., each, node can send requests to receive data to (and/or exchange requests to receive data with) plural other nodes. Equally, one or more given, e.g., each, node can accept and process as discussed above requests to receive data from plural other network nodes. This would allow, for example, a network node to maintain data requests (e.g., read commands) outstanding with every other node with which it needs to send and receive messages. Thus, in one embodiment, every node of the network sends a request to receive data in accordance with the present invention to every other node of the network and maintains a pending such request with every other node of the network (or at least those nodes with which it knows it will, or expects to need to, receive messages from).

As discussed above, the present invention is applicable to the transfer of higher level, application messages (as against lower level, protocol messages) between nodes of the network. Examples of such application messages that will be transferred in response to the request to receive data thus include data or metadata request, grant, lock or invalidate messages that perform actions on or in relation to the access of data in storage devices of the network. However, embodiments of the invention can also or instead be used to transfer data, such as a copy of modified data held in a write cache, or a copy of metadata such as a bitmap that is to be transferred between two nodes. This could be done, for example, by arranging for the "message" transferred in response to the request to receive data to carry the data along with a description of the data being transferred (such as a header describing the data being transferred). It will be appreciated that in this arrangement, unlike in more conventional data transfer processes, the identity of the data that is sent (i.e. being transferred) will not be known when the request to receive data is sent, rather the receiver will identify the data from the header associated with the data in the message.

The present invention can be used with any communications network and protocol that supports the use of requests to receive data (e.g., read commands) between network nodes. It is particularly applicable to networks that use the Fibre Channel and/or SCSI communications protocols, and is thus applicable to any (network) fabric technology which supports the SCSI protocol, such as conventional parallel SCSI, Fibre Channel, and SSA, as well as proposed protocols such as iSCSI and Infiniband (SRP). The present invention can also be applied to two-way entry/midrange storage controllers and adapters. Embodiments of the present invention are applicable to any (distributed) storage system that has two or more nodes.

In a SCSI-based system, the request to receive data is preferably a SCSI read command and it can be seen that in such an arrangement, the present invention will use a pending SCSI read command to "pull" the message through the network to the intended receiver. Thus, according to one embodiment of the present invention, there is provided a method of transmitting a message between two nodes of a communications network, the method comprising: a first node of the network transmitting a read command to another node of the network; and the other node of the network transmitting the message to the first node in response to the read command.

The (or each) node of the network can be made up of a number of devices, etc., as is known in the art. The node will typically include at least one processing device or peripheral device (such as a storage device), together with one or more ports or adapters to interface the processing and/or peripheral devices of the node with the communications network. Preferably the various operations of the present invention are carried out by and/or under the control of the interface port or adapter of the node (which therefore preferably includes the apparatus in accordance with the present invention discussed above). It would be possible to use appropriately arranged and/or modified SCSIadaptors SCSI-adapters for this purpose.

One exemplary protocol adapter of the node that controls its operation in accordance with the present invention is able to at least correlate outgoing requests to receive data with incoming responses to those requests and is able to be normally able to handle such responses without burdening other devices of the receiving node (system) with work.

The methods in accordance with the present invention may be implemented at least partially using software, e.g., computer programs. It will thus be seen that when viewed from further aspects the present invention provides computer software specifically adapted to carry out the methods hereinabove described when installed on data processing means, and a computer program element comprising computer software code portions for performing the methods hereinabove described when the program element is run on data processing means. The invention also extends to a computer software carrier comprising such software that, when used to operate communications network nodes comprising data processing means, causes in conjunction with said data processing means said nodes to carry out the steps of the method of the present invention. Such a computer software carrier could be a physical storage medium such as a ROM chip, CD ROM or disk, or could be a signal such as an electronic signal over wires, an optical signal or a radio signal such as to a satellite or the like.

It will further be appreciated that not all steps of the method of the invention need be carried out by computer software and thus from a further broad aspect the present invention provides computer software and such software installed on a computer software carrier for carrying out at least one of the steps of the methods set out hereinabove.

Figure 1:
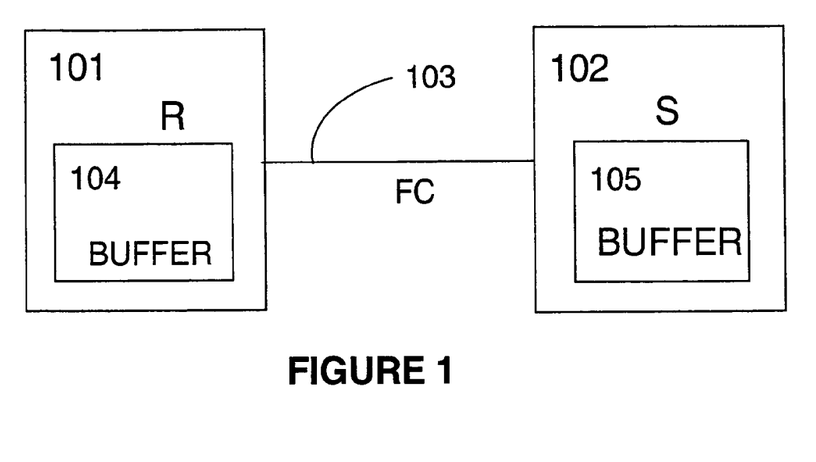
FIG. 1 shows schematically two nodes of a computer network that can be operated in accordance with the present invention.

FIG. 1 shows schematically a preferred embodiment of the present invention comprising a computer communications network having two nodes 101, 102 communicating with each other over a single communications channel 103 and in which application messages are sent in just one direction between the two nodes. (However, as discussed above and as will be appreciated by those skilled in the art, the invention can also be used, inter alia, to allow such messages to be exchange symmetrically between the two nodes, with each node adopting both the role of sender and receiver, and can also be used in networks where there are more than two nodes.)

Each node 101, 102 of the computer network shown in FIG. 1 comprises a computer system that includes, for example, a processing or peripheral device or devices and a network port or adapter that interfaces between the device or devices of the node and a communications channel 103 linking the nodes. In this embodiment, node 101 is the message receiver and node 102 is the message sender. Message receiving node 101 contains a buffer memory 104 dedicated to receiving messages, and message sending node 102 contains a buffer memory 105 dedicated to the task of sending messages. Nodes 101 and 102 are connected over a full-duplex Fibre Channel communications channel 103.

Figure 2:
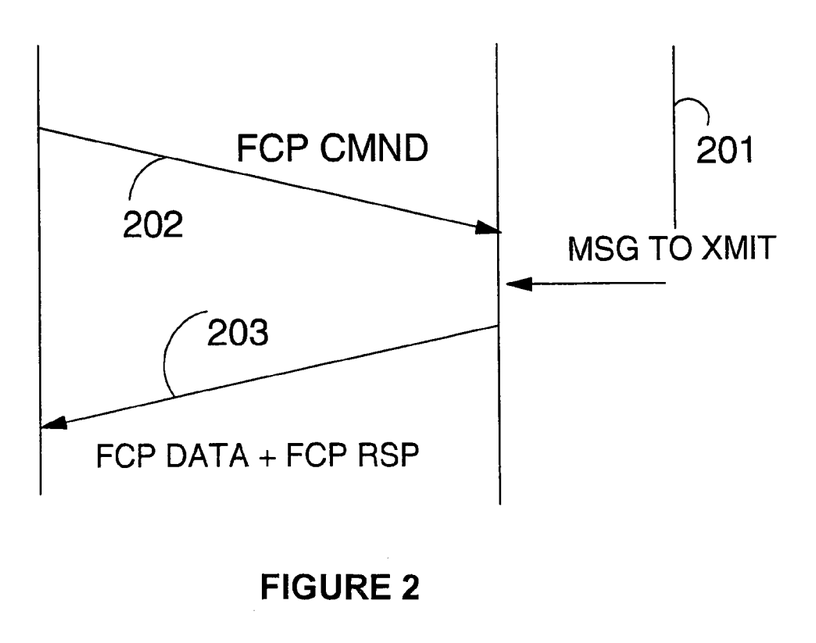
FIG. 2 shows schematically the overall message flow between the network nodes of FIG. 1 in accordance with an embodiment of the present invention.

FIG. 2 shows schematically the overall message flow between the nodes 101 and 102 when an application message is to be sent by node 102 to receiving node 101. In this embodiment, it is assumed that nodes 101, 102 communicate using the FCP protocol (i.e. SCSI over Fibre Channel), as is commonly implemented by storage vendors of Fibre Channel host bus adapters, and so the protocol messages exchanged (called "information units" in the Fibre Channel protocol) will be described with reference to the FCP protocol. However, as discussed above and as will be appreciated by those skilled in the art, the present invention is equally applicable to other environments such as SCSI or iSCSI (in which case other terms would apply for the protocol messages).

The first operation in the process is for node 101 to send a request to node 102 to receive data, which request is sent in the form of a read command 201 (FCP_CMND) protocol message to node 102. Node 102 then responds to that read command when it has an application message 202 to transmit to node 101. At that point, message sending node 102 packages the application message 202 to be transmitted to node 101 into an appropriate FCP protocol message (FCP_DATA) and sends it together with a read command completion protocol message (FCP_RSP) as the completion response 203 to the read command 201 sent to node 101.

Figure 3:
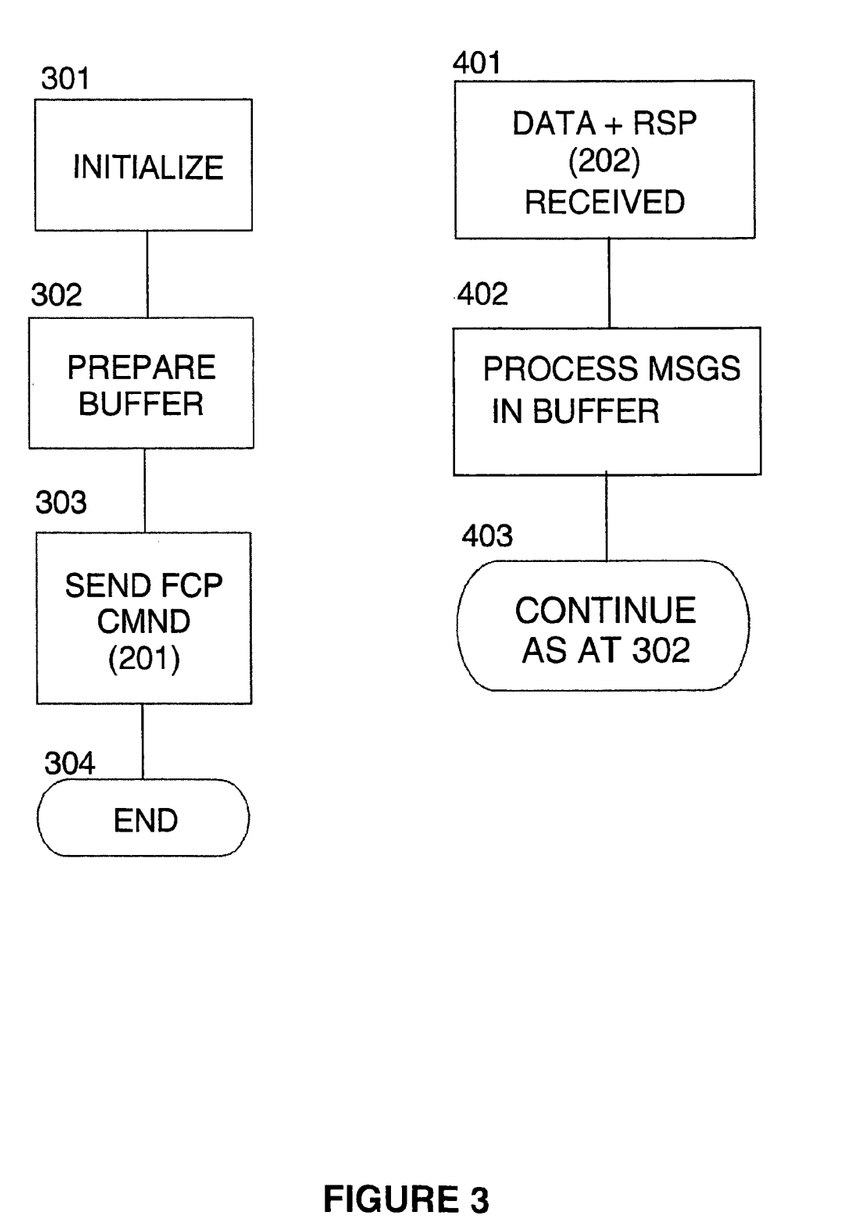
FIG. 3 is a flowchart showing the steps that a message receiving node will carry out in accordance with an embodiment of the present invention.

FIG. 3 shows in more detail operations that node 101 which sends the read command and receives the application message performs as part of this process. Node 101 first initializes (process block 301), and then prepares a buffer 104 (process block 302) for receiving messages. It then transmits a read command 201 (FCP_CMND) protocol message referencing the buffer 104 it has just prepared to the expected message sending node (node 102) (process block 303) and completes its processing for the time being (process block 304).

When node 101 receives a completion message 202 (DATA+RSP) for the read command it sent to node 102, it recognizes that fact (process block 401) and examines its buffer 104 to retrieve and process the received message or messages (process block 402). It then repeats the processing performed at initialization (process blocks 302 to 304) to transmit a new read command to node 102 with which to receive further messages (process block 403).

Figure 4A:
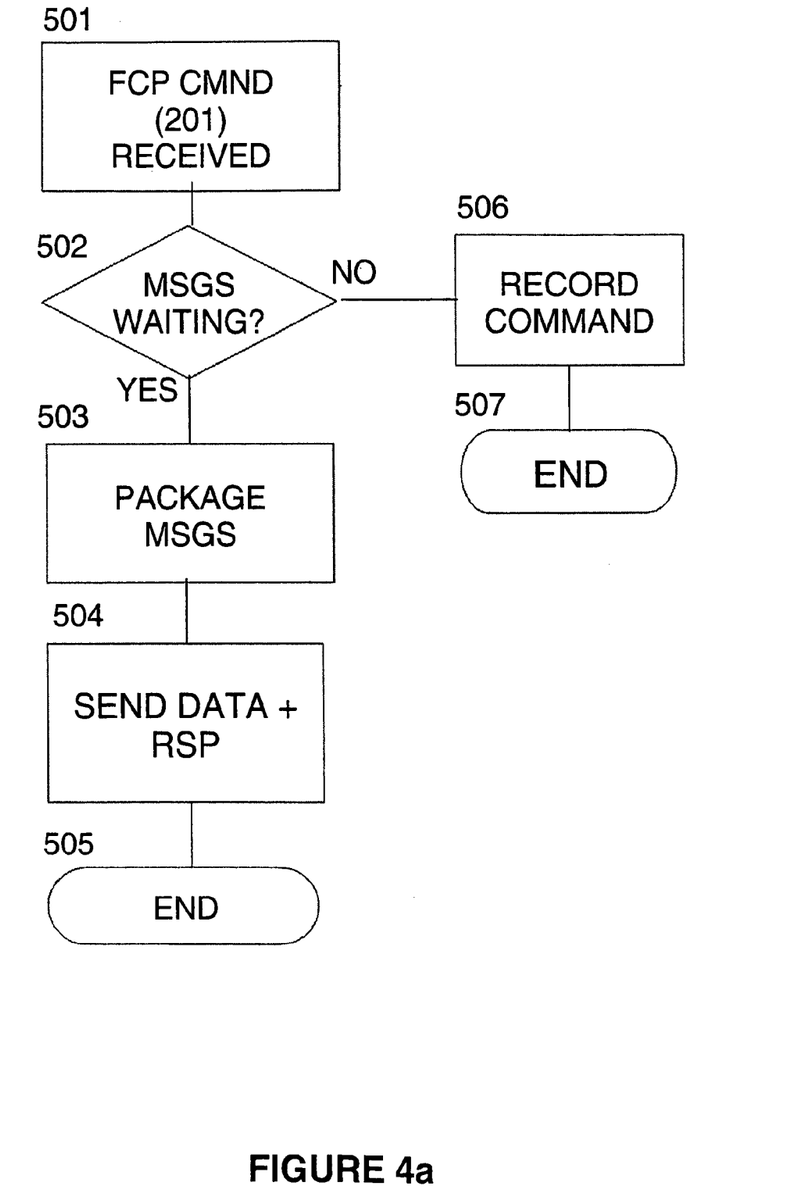
FIGS. 4a and 4b show the steps that a message sending node will carry out in accordance with an embodiment of the present invention.
Figure 4B:
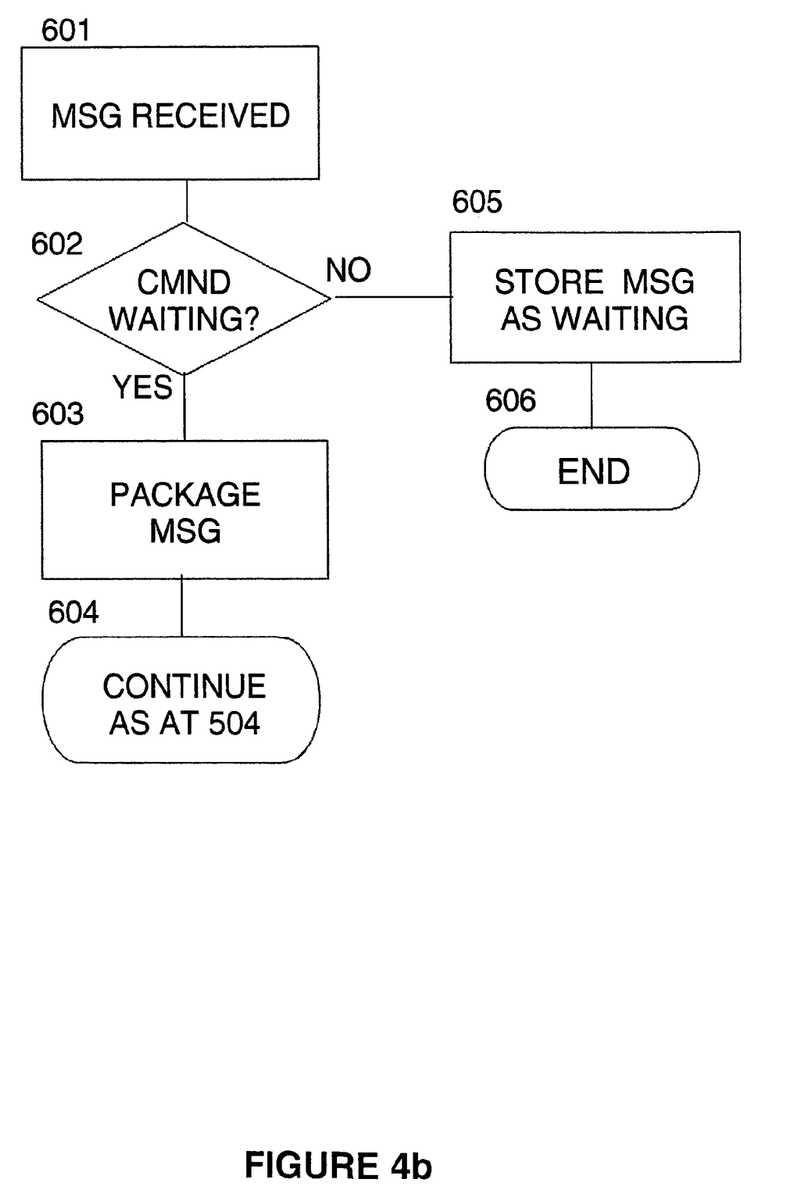

FIGS. 4a and 4b show in more detail operations performed by node 102 as part of the message transmission process.

As shown in FIG. 4a, node 102 first receives read command 201 from node 101 (process block 501) and examines whether it has already received notification of (application) messages that need to be transmitted to node 101 (process block 502). If node 102 already has messages for transmission, it then proceeds to package as many messages as it has (and can) into its message sending buffer 105 (process block 503) up to the limit of the storage capacity that it knows is available for messages at node 101 (which storage capacity can be defined by prior agreement or dynamically assigned and communicated from node 101 to node 102 at each request to receive data (e.g., with read command 201)). Node 102 then sends completion message 202 comprising an application message to be transmitted to node 101 and the completion status protocol message for the read command (process block 504) to node 101 and ends its processing (process block 505).

If, on the other hand, there were no messages waiting for transmission when the read command from node 101 was initially received (process block 502), then node 102 records that the read command has been received (process block 506) and ends its processing (process block 507) until a message for transmission is received.

FIG. 4b shows the steps taken by node 102 when it receives an application message for transmission to node 101. Upon receipt of such a message for transmission (process block 601), node 102 determines whether a read command from node 101 has already been received and is waiting for the submission of messages (process block 602) (this is done by checking for the record made at process block 506 above). If there is already a read command waiting, then the new message received (process block 601) is immediately packaged for transmission (process block 603) and transmitted (process block 604) by continuing the illustrated process embodiment at process block 504 et seq.

If it is instead found that there is no read command waiting, then the application message for transmission is stored (process block 605) and processing ended (process block 606) until a read command is received. In this case, the record of the application message being stored will be detected when a read command is received and will cause the message to be transmitted immediately (following step process block 502 and then process blocks 503 to 505 in FIG. 4a).

It will be appreciated from the above that the described message exchange may be modified, (e.g., can be expanded to allow both transmission and reception both ways between nodes 101 and 102, and also to expand the arrangement to systems comprising more than two nodes). Also, a message transferred between the nodes could include data, as discussed above.

In one embodiment, nodes 101 and 102 will include, as is known in the art, communications network adapters that interface to communications channel 103 (and hence to the other node). The above-described message process could therefore be mapped to the hardware interface of a particular adapter (e.g., SCSI adapter) being used. That can be done in any suitable manner. An exemplary embodiment of an interface hardware mapping suitable to allow an interface chip that can perform SCSI-type I/O (read/write) operations to operate in accordance with the present invention will now be described. The capabilities of this interface chip are a subset of those that might be found in any commercially available adapter card from many vendors (such as Agilent, QLogic, Adaptec, etc.).

The interface chip of this embodiment implements FCP (SCSI over FiberChannel), but the same interface would work equally for media that carry SCSI, or other I/O interfaces that have similar requirements.

The interface chip is intended to be installed in an I/O bus, such as a PCI or PCI-X bus, or a bus for any emerging technology such as Rapid I/O. It could, for example, be installed as a physically discrete adapter card, be inserted into a compatible slot in a server computer, be a component in a custom-designed storage controller, or be installed by any other method supported by the chip.

According to one embodiment, the interface chip operates to implement a control interface which allows controlling software for the chip to request services from the chip and be notified of such services having been made and other events of importance, as is known in the art. The controlling software could be installed as a device driver in a conventional operating system, such as Windows 2000™, or be a portion of code running in a controller, or take any other appropriate form. The controlling software will, as is known in the art, translate between the services offered by the interface chip and the requirements of the operating environment.

To be able to carry out its various operations, the interface chip of this embodiment implements an Input Queue and an Output Queue which are used to carry Control Blocks, as is known in the art. The Input Queue carries control blocks describing service requests from the controlling software into the interface chip where the service is then performed. The Output Queue carries information from the interface chip to the controlling software, such as information on the results of previous requests received on the Input Queue, as well as other events of note.

Each of these queues is implemented within a region of memory which is broken into equal-sized pieces, with each piece being able to contain a single Control Block entry. Entries within the queues are used in strict ascending address order, until the last entry is used, at which point the first entry (with lowest address) is used again. (However, as will be appreciated by those skilled in the art, other arrangements are possible.) The location and size of each queue is defined in appropriate registers.

As is known in the art, the producer for a queue (e.g., the interface chip in the case of the Output Queue), must indicate when an element has been made available in the queue. To do this it updates a register which can be read by the consumer for the queue (e.g., the controlling software in the case of the Output Queue). The register is advanced each time an entry is added to the queue, and points to the next free slot (i.e. the slot after the newly added entry).

The consumer for a queue must also indicate when an element has been processed from the queue. To do this it also updates a register which can this time be read by the producer for the queue. The register is advanced each time an entry is processed, and points to the next entry which needs to be processed.

It will be appreciated that in this arrangement, when both the consumer and producer indices point at the same entry, the queue is empty (i.e. contains no unprocessed elements), and when the producer index is one entry behind the consumer index, the queue is full (even though one entry is unused). In the latter case, the producer must wait for elements to be made available by the consumer, and is not able to queue new elements.

In this embodiment, to reduce the risk of the use of the control block queue leading to deadlock, the total number of outstanding requests allowed for any connection is limited and the chip is arranged to ensure that the control block queues are large enough to hold all the messages associated with the permitted number of outstanding requests (although other techniques could be used if desired).

In the present embodiment, the input and output queues are located in memory external to the interface chip, which memory is accessible to both the interface chip and its controlling software, and is under the control of a memory management system, such as a virtual memory manager. The controlling software performs system calls to make the memory accessible to the interface chip. Other arrangements are possible.

The Output Queue also has an interrupt mechanism associated with it, which notifies the processing unit executing the controlling software that a new Control Block has been added to the Output Queue. This interrupt mechanism could be, for example, an interrupt line on a PCI bus, a message-signaled-interrupt in PCI-X, or any other mechanism which allows such messages to be sent.

In order to be able to operate in accordance with the above-described embodiment of the present invention, the interface chip needs to be able to accept control blocks to perform the following command requests:

Transmit FCP_CMND frame and expect incoming FCP_DATA frames with FCP_RSP frame.

Transmit FCP_DATA frames followed by an FCP_RSP frame.

(which will be placed in the Input Queue by the controlling software when those functions are required) and to create the following control blocks (which will be placed in the Output Queue by the interface chip to notify the controlling software of the associated events):

Transmit FCP_CMND and incoming FCP_DATA and FCP_RSP Complete.

Transmit FCP_DATA and associated FCP_RSP frame Complete. FCP_CMND frame received.

These control blocks and the corresponding interface chip operation will now be described in more detail with reference to the use of such an interface chip to perform a message transfer between two nodes of a data communications network, each containing an interface chip in accordance with this embodiment. The described operation will basically follow the process operations set out in FIGS. 2, 3, 4a and 4b above.

As discussed above, in the above-described embodiment of the invention the first step of the message transfer process is for an initiating node (i.e. transmitter of the request to receive data) to prepare memory buffers to receive a message that is sent in reply to the request to receive data and the completion-indicating FCP_RSP frame that is also returned with the message. In this embodiment, two buffers are prepared for this purpose, one for the message and one for the FCP_RSP frame. The initiating node also defines an identifier which can be used to identify the particular request to receive data in question (e.g., to recall the particular request to receive data when the response to the request is being processed). This operation is carried out by the interface chip controlling software at the initiating node.

The next step of the message transfer process is for the initiating node (i.e. the node which sends the request to receive data and receives the message in response thereto) to send a request to receive data (in this embodiment in the form of a read command) to the other node of the network and also to prepare itself for receipt of a response to that request to receive data when that response is received.

The interface chip in the initiating node is controlled to carry out these operations by the controlling software placing a Transmit FCP_CMND and expect (receive) incoming FCP_DATA frames with FCP_RSP frame Control Block in the Input Queue (at which point it then advances its producer register to indicate the presence of a new control block in the Input Queue). The control block for this command contains:

a field which identifies the control block's type;

a unique identifier to allow this particular request to receive data to be identified (and which will, inter alia, be returned to the controlling software in a completion message in the Output Queue);

a reference to the intended receiver of this request to receive data in the form, in this embodiment, of a Fibre Channel address;

a SCSI Command Descriptor Block (CDB) for the read command (embodying the request to receive data) that is to be sent;

the address and size of the memory buffer prepared and owned by the controlling software into which the incoming response message data is to be placed; and the address and size of the memory buffer where the response completion protocol message (in this case the FCP_RSP flame) is to be placed.

(In this embodiment this Control Block assumes that the memory buffers provided are accessible at a single address, as contiguous memory, but it would also be possible to scatter incoming data across disparate memory locations described in a scatter-gather list.)

On receipt of such a control block, the interface chip creates an FCP_CMND frame conforming with the SCSI architecture into which it embeds, inter alia, the SCSI Read Command Command Descriptor Block from the control block and an Originator Exchange Identifier (OX_ID) (which it allocates and which will be used, inter alia, by the target node receiving the request to receive data to "label" its response to that request to allow the initiating node to identify and verify the response). The interface chip then inserts any other required fields as defined by the (FCP) standards, generates any necessary error check codes (e.g., CRCs), and encodes the frame for transmission over the Fibre Channel link.

The interface chip then determines the 24 bit Destination ID (D_ID) of the intended receiver of the read command from the reference to the intended receiver in the control block, and transmits the constructed frame through the communications network to the target node. The Input Queue consumer register is then advanced to indicate that the queue entry can be reused.

The interface chip at the target node will then receive and process the FCP_CMND frame (i.e. the request to receive data). The first step in this process is for the target node interface chip, once the request has been received, to place a FCP_CMND frame received Control Block in the next free slot in its Output Queue to inform its controlling software of the receipt of the request to receive data.

This FCP_CMND flame received Control Block contains:

a field which identifies it as a FCP_CMND frame received control block;

an identifier which identifies the transmitter of the FCP_CMND frame (i.e. the transmitter of the read command (the request to receive data));

the contents of the command (i.e. FCP_CDB) transmitted (i.e. that it is a read command: a request to receive data); and the Originator Exchange Identifier (OX_ID) embedded within the FCP_CMND frame.

The interface chip also advances its producer register to indicate the presence of a new control block.

The controlling software at the target node is then interrupted, and begins processing by examining the producer register, which will indicate that a new Output Queue entry is available. The controlling software will examine the new entry and process the FCP_CMND frame, by analyzing the transmitter of the message and the SCSI command (SCSI CDB) it contains.

The target node then performs processing conforming to the SCSI protocol, to determine whether the received (read) command can be processed, and, if it can, what message data needs to be transmitted in response thereto. The determined message data is then placed into memory accessible to the interface chip. (As will be appreciated by those skilled in the art, there are many ways in which this data can be obtained). The target node also prepares a data transfer complete protocol message in the form of a FCP_RSP frame which contains a SCSI Good Status. Finally, having completed analysis of the FCP_CMND frame, the target node advances its consumer register.

The interface chip of the target node is then instructed to send the message and message complete protocol message to the requesting node by the controlling software of the target node placing a Transmit FCP_DATA frames followed by an FCP_RSP frame Control Block in the Input Queue of the interface chip (and then advancing the associated producer register to indicate the existence of the control block in the queue). This control block contains:

a field which identifies it as this kind of the control block's type;

a unique identifier which will be used to distinguish this request response from other such request responses that may be outstanding (and which will, inter alia, be returned to the controlling software in a completion message in the Output Queue);

a reference to the intended receiver of the data (message and FCP_RSP frame) (i.e., the requesting node);

the Originator Exchange Identifier (OX_ID) from the request to receive data from the initiating node (which the interface chip will insert into the transmitted frames to allow the receiver of the transmitted frames to check that the frames are in response to a request to receive data sent by the receiver);

the address and size of the memory buffer owned by the controlling software into which the message data to be transmitted has been placed; and the address and size of the memory buffer into which the FCP_RSP protocol message to be transmitted has been placed.

On receipt of this control block, the interface chip begins by transferring an initial portion of the message data from the indicated memory buffer and placing it in an FCP_DATA frame. The amount of message data transferred is chosen so as to fill an FCP_DATA frame and make efficient use of the resources of the system. A header is then added to the frame, which header includes the destination identifier (D_ID) of the intended receiver, and the Originator Exchange Identifier (OX_ID) from the control block (and that the receiver provided in their FCP_CMND frame). The frame is completed by adding error check codes (e.g., CRC) and framing information, and then encoded for transmission and transmitted on the Fibre Channel link.

The interface chip then continues by transferring the next portion of message data from the indicated memory buffer, constructing another FCP_DATA frame around that portion of memory data as above, and then transmitting the frame, and so on, until all the message data indicated by the control block has been transmitted.

The interface chip then transfers the payload contents of the FCP_RSP frame from the memory buffer indicated by the control block into a FCP_RSP frame, constructs the rest of the frame header for the FCP_RSP frame in the same way as for the FCP_DATA frames, and transmits the FCP_RSP frame to the intended receiver.

Having confirmed the transmission of this last frame, the interface chip advances its consumer index for the Input Queue and generates and places an FCP_DATA+FCP_RSP Complete Control Block in the next available entry in the Output Queue to inform the controlling software that the message has successfully (or otherwise) been transmitted (and advances the producer register for the Output Queue to indicate the presence of this new control block). This Control Block contains:

a field which identifies it as this type of the control block's type;

the unique identifier provided by the controlling software in the Transmit FCP_DATA frames followed by an FCP_RSP frame Control Block; and a field that indicates whether any error was encountered, or that no error was encountered.

When the target node is again interrupted and examines the producer register and Output Queue, it will find the completion control block for its Transmit FCP_DATA and FCP_RSP control block, and identify the specific control block which has been actioned using the unique identifier in the completion control block. The target node can then perform steps to recover and free the resources associated with its processing of the Read command, and advance the consumer register for the Output Queue to release the entry for reuse. The next stage of the process will be the receipt by the interface chip of the initiating node of the FCP_DATA frames (and FCP_RSP frame) sent by the target node in response to the read command. The initiating node will identify such frames by matching the (OX_ID) included in the received frames with the value of that identifier sent with its original read command. It will then validate each frame, ensuring that fields such as the destination identifier (D_ID), and the error check codes are correct.

Once each frame is validated, the interface chip will strip off the header information, and transfer the payload to the buffer identified in the original Transmit FCP_CMND and expect (receive) incoming FCP_DATA frames with FCP_RSP frame Control Block. The data from the first FCP_DATA frame received will be placed at the origin of the buffer provided, with the interface chip then maintaining a counter of the data received, so that subsequent FCP_DATA frames have their payload placed adjacent to that of preceding frames. The interface chip will ensure that the total amount of data received does not exceed the size of the memory buffer provided.

Once the FCP_DATA frames have been received, the FCP_RSP frame is received, which is again associated with the appropriate issued read command using the Originator Exchange Identifier (OX_ID) field included in the FCP_RSP frame. The FCP_RSP frame contents are then transferred to the buffer indicated in the original Transmit FCP_CMND and expect (receive) incoming FCP_DATA frames with FCP_RSP frame Control Block.

After the FCP_RSP frame is processed, the interface chip places a

Transmit FCP_CMND and incoming FCP_DATA and FCP_RSP Complete control block in the Output Queue to indicate successful (or otherwise) completion of the read command (and advances the producer register to indicate the presence of this new control block). This control block contains:

A field which identifies the control block's type;

the unique identifier provided by the controlling software in the original read request (to allow this completion control block to be matched to the appropriate read request);

a report on the total amount of data received, both in the data buffers and the FCP_RSP buffer; and a field that indicates whether any error was encountered, or that no error was encountered.

The processor of the controlling software is then interrupted, and examines the producer register, at which point it will find this control block and use the unique identifier it includes included therein to determine which command has completed. The FCP_RSP flame is then examined, its Status confirmed (i.e. whether it is Good or otherwise), and the field describing the amount of data transferred checked. The controlling software can then release the resources associated with the original read command, and advances the consumer register for the Output Queue. The controlling software will then continue by making appropriate use of the message (data) it has received from the target node.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention.

The invention claimed is:

1. A system for communicating an application message between a plurality of nodes, comprising:
 a processor executing instructions stored in memory to provide a plurality of nodes, coupled to and in communication with each other, each node comprising:
 a respective first buffer, and
 a respective second buffer, wherein each node is configured for:
 preparing its respective first buffer for receiving application messages, transmitting a read request to every other node, wherein:
  each read request is transmitted in response to each respective first buffer being prepared for receiving messages, and
  each read request comprises a reference to its respective first buffer,
commanding every node to transmit one or more application messages to its respective first buffer,
receiving each read request,
determining, at a first time, whether its second buffer comprises the one or more application messages for transmittal to each node in response to a receipt of each read request, and
immediately processing each read request if the second buffer comprises the one or more application messages at the first time, wherein processing each read request comprises:
  transmitting an application message of the one or more application messages from each node to every other node in response to a determination that the second buffer comprises the one or more application messages, the application message specifying that each respective first buffer is a destination of the application message, and
  recording data indicating that each read request from every other node has been received in response to a determination that the second buffer does not comprise the one or more application messages.

2. The system of claim 1, further including suspending processing of each read request until the second buffer comprises the one or more application messages if the second buffer does not comprise the one or more application messages at the first time; and
  wherein, when transmitting the application message of the one or more application messages, each node is configured for storing the application message within the first buffer.

3. The system of claim 1, wherein, when receiving each read request from every other node, each node is further configured for receiving a first command protocol message, and wherein, when transmitting the application message, each node is further configured for transmitting a second command protocol message.

4. The system of claim 3, wherein the first command protocol message comprises a Fibre Channel Protocol Command Frame, and the second command protocol message comprises a Fibre Channel Protocol Data Frame.

5. The system of claim 1, wherein the sending node is further configured for:
  determining, at a second time, that the second buffer comprises the application message; and
  processing each read request in response to the determining at the second time.

6. A non-transitory computer storage medium including a computer program product executed by a processor for communicating an application message between a plurality of nodes of a data processing system cluster, the computer storage medium comprising:
  computer code for determining, at a first time, whether one or more application messages for transmittal from a sending node to a plurality of receiving nodes may be currently transmitted, wherein the computer code for determining comprises:
    computer code for preparing, by each receiving node, a first buffer associated with each respective receiving node for receiving application messages, and
    computer code for transmitting, by each respective receiving node, a read request to the sending node, wherein:
      each read request is transmitted in response to each respective first buffer being prepared for receiving messages, and
      each read request comprises a reference to its respective first buffer and commanding the sending node to transmit one or more application messages to its respective first buffer;
  computer code for determining whether a second buffer associated with the sending node comprises the one or more application messages in response to a receipt, at the sending node, of each read request;
  computer code for determining whether each respective first buffer includes a sufficient amount of available memory for storing the one or more application messages;
  computer code for determining whether each read request has been received at the sending node;
  computer code for immediately processing the one or more application messages if the second buffer comprises the one or more application messages at the first time;
  computer code for recording, at the sending node, each read request until the second buffer comprises the one or more application messages if the second buffer does not comprise the one or more application messages at the first time; and
  computer code for determining, at a second time, that the second buffer comprises the one or more application messages.

7. The computer storage medium of claim 6, further comprising computer code for processing each read request in response to the determining at the second time; and
  wherein the computer code for processing comprises computer code for transmitting, in response to the receipt, at the sending node, of each read request from the receiving node to receive data, an application message of the one or more application messages from the sending node to each receiving node utilizing an input/output protocol and data specifying each respective first buffer in response to a determination that the second buffer comprises the one or more application messages and the first buffer includes the sufficient amount of available memory.

8. The computer storage medium of claim 6, wherein the computer code for processing comprises:
  computer code for transmitting, in response to the receipt, at the sending node, of each respective read request, an application message of the one or more application messages from the sending node to each receiving node utilizing an input/output protocol and data specifying the first buffer in response to a determination that each respective read request has been received at the sending node; and
  computer code for storing the one or more application messages within the second buffer in response to a determination that each read request from the receiving node has not been received at the sending node.

9. The computer storage medium of claim 8, wherein the computer code for processing further comprises computer code for storing the application message within each respective first buffer.

10. The computer storage medium of claim 7, wherein the input/output protocol comprises a Fibre Channel Protocol and wherein the computer code for transmitting the application message of the one or more application messages comprises computer code for transmitting a Fibre Channel Protocol Data Frame.

11. The computer storage medium of claim 8, wherein the computer code for processing further comprises computer code for storing the application message within the first buffer.

12. The computer storage medium of claim 8, wherein the input/output protocol comprises a Fibre Channel Protocol and further wherein the computer code for transmitting the application message of the one or more application messages comprises computer code for transmitting a Fibre Channel Protocol Data Frame.

13. The computer storage medium of claim 6, wherein the sending node is further configured for:
determining, at a second time, that the second buffer comprises the application message; and
processing each read request in response to the determining at the second time.

14. A system for communicating an application message between a plurality of nodes, comprising:
a processor executing instructions stored in memory to provide a plurality of nodes, coupled to and in communication with each other, each node comprising:
a first buffer, and
a second buffer, wherein each node is configured for:
preparing its respective first buffer for receiving data,
transmitting a read request to every other node, wherein:
each read request is transmitted in response to each respective first buffer being prepared for receiving data, and
each read request comprises a reference to its respective first buffer and requesting every other node to transmit data to its respective first buffer,
receiving each read request,
determining if its second buffer includes the requested data,
immediately processing each read request at a first time if the second buffer includes the requested data,
transmitting the requested data to each respective first buffer when each respective read request is processed at the first time, and
recording each read request if the second buffer does not comprise the requested data at the first time.

15. The system of claim 14, wherein each node is further configured for:
suspending processing of each read request until the second buffer comprises the requested data if the second buffer does not comprise the requested data at the first time;
determining, at a second time, that the second buffer comprises the requested data; and
processing each read request in response to the determining at the second time.

16. The system of claim 14, wherein each node is further configured for:
determining an amount of available memory in the first buffer; and
including indicia data in each read request indicative of the amount of available memory.

17. The system of claim 16, wherein each node is further configured for:
determining that the requested data requires more memory space than the amount of available memory in the first buffer;
declining to transmit the requested data when the requested data requires more memory space than the amount of available memory in the first buffer; and
notifying each node that the requested data requires more memory space than the amount of available memory in its respective first buffer.

* * * * *